(12) United States Patent
Sudbrink et al.

(10) Patent No.: US 10,051,775 B2
(45) Date of Patent: Aug. 21, 2018

(54) FRAME LATCH SYSTEM

(71) Applicant: CNH Industrial America LLC, New Holland, PA (US)

(72) Inventors: Matthew R. Sudbrink, Metamora, IL (US); Matthew P. Morgan, Peoria, IL (US); Dean A. Knobloch, Tucson, AZ (US)

(73) Assignee: CNH Industrial America LLC, New Holland, PA (US)

( * ) Notice: Subject to any disclaimer, the term of this patent is extended or adjusted under 35 U.S.C. 154(b) by 77 days.

(21) Appl. No.: 15/208,715

(22) Filed: Jul. 13, 2016

(65) Prior Publication Data

US 2018/0014451 A1    Jan. 18, 2018

(51) Int. Cl.
*A01B 73/04* (2006.01)
*A01B 73/06* (2006.01)

(52) U.S. Cl.
CPC ............ *A01B 73/048* (2013.01); *A01B 73/06* (2013.01)

(58) Field of Classification Search
CPC ......................................... A01B 73/02–73/067
USPC ................................ 172/481, 466, 457, 494
See application file for complete search history.

(56) References Cited

U.S. PATENT DOCUMENTS

| | | | | |
|---|---|---|---|---|
| 3,814,191 A | * | 6/1974 | Tilbury ................. | A01B 73/044 172/311 |
| 3,955,627 A | * | 5/1976 | Brown .................. | A01B 69/024 172/130 |
| 4,136,743 A | * | 1/1979 | van der Lely ....... | A01B 73/042 172/117 |
| 4,324,296 A | | 4/1982 | Schenk et al. | |
| 4,529,043 A | * | 7/1985 | Jensen ................. | A01B 73/046 172/311 |
| 4,660,654 A | * | 4/1987 | Wiebe .................. | A01B 73/044 172/311 |
| 4,700,784 A | | 10/1987 | Wiebe et al. | |
| 4,867,245 A | * | 9/1989 | Stevens ................ | A01B 73/046 172/311 |
| 4,993,499 A | | 2/1991 | Bourgault et al. | |
| 6,076,613 A | * | 6/2000 | Frasier ................. | A01B 73/065 111/57 |
| 6,202,756 B1 | * | 3/2001 | Hundeby ............... | A01B 63/32 172/311 |
| 6,209,657 B1 | * | 4/2001 | Friggstad ............... | A01B 73/02 172/322 |

(Continued)

*Primary Examiner* — Matthew D. Troutman
(74) *Attorney, Agent, or Firm* — Rebecca L. Henkel; Rickard K. DeMille

(57) ABSTRACT

A latching arrangement for an agricultural implement having components which may be retracted or folded from an extended operational position to a stowed position better suited to transport and/or storage including a first remotely operable actuating mechanism for moving a component between the stowed and extended positions, a lever having a component engaging hook near one end and a fulcrum fixed to the implement, and a second remotely operable actuating mechanism for selectively engaging the hook and component only when the component is in the stowed position. The second actuating mechanism is operable independently of, and from the same location as, the first actuating mechanism. The second actuating mechanism comprises a hydraulic cylinder fixed to the implement and having a piston rod coupled to the lever near a lever end opposite the hook.

11 Claims, 4 Drawing Sheets

(56) References Cited

U.S. PATENT DOCUMENTS

| | | | |
|---|---|---|---|
| 6,293,352 B1* | 9/2001 | Hundeby | A01B 63/32 |
| | | | 111/54 |
| 6,305,478 B1 | 10/2001 | Friggstad | |
| 6,457,675 B1 | 10/2002 | Plude et al. | |
| 7,100,350 B2* | 9/2006 | Breneur | A01D 78/1007 |
| | | | 172/481 |
| 7,438,137 B2 | 10/2008 | Pederson et al. | |
| 7,849,933 B2* | 12/2010 | Marggi | A01B 73/067 |
| | | | 172/311 |
| 8,118,110 B2 | 2/2012 | Tamm et al. | |
| 8,176,992 B2 | 5/2012 | Yuen | |
| 8,468,655 B2 | 6/2013 | Borkgren et al. | |
| 8,636,078 B2 | 1/2014 | Yuen | |
| 9,148,987 B2 | 10/2015 | Baker | |
| 9,549,496 B2* | 1/2017 | Sudbrink | A01B 73/065 |
| 2006/0090910 A1 | 5/2006 | Houck | |
| 2015/0156955 A1 | 6/2015 | Sudbrink et al. | |
| 2015/0305224 A1 | 10/2015 | Casper et al. | |

\* cited by examiner

FRAME LATCH SYSTEM

BACKGROUND OF THE INVENTION

1. Field of the Invention

The present invention relates to agricultural implements, and, more particularly, to such implements having articulated portions which may be moved between extended and compacted positions for an agricultural operation and transport respectively.

2. Description of the Related Art

One result of the demands of modern farming techniques is the tendency to manufacture various farming implements in greater and greater widths to reduce the time and required number of passes in tilling, planting, applying fertilizer, herbicides, etc., and harvesting crops. A drawback of the increasing widths is the problem of transporting the implement on public roadways. The typical solution for this problem is the creation of implements which retract or fold laterally extending implement portions for transport or storage.

For example, U.S. Pat. No. 7,438,137 discloses a field cultivator having a pair of laterally extendable/retractable wings. The wings are pivotable to a generally vertical position for transport and there is a locking arrangement for the foldable wing frame of the implement which latches an actuating cylinder in the retracted (wings raised) position. The latch may be engaged by gravity. In this patented arrangement, there are two wings extending laterally in the operational position and pivotal upward and toward one another about respective generally horizontal axes into the transport position. Once the implement assembly has been moved to a field or other location where the wing frame should be lowered into the operating position, an implement user can dismount the tractor or other primary mover and walk back to the cylinder latch assembly where simply lifting the distal end of the latch member unlocks the cylinder.

A somewhat more sophisticated folding arrangement is shown in U.S. Pat. No. 8,636,078 where laterally extending wings of a planting system include fore and aft extending portions. In preparation for transport, these fore and aft portions are folded upward about a generally horizontal axis from their generally horizontal attitude and toward one another into a vertical attitude. Thereafter, the wing assembly is pivoted inwardly about a generally vertical axis toward the body of the implement. Inadvertent deployment of the wings during transit is prevented by a push-pull cable controlled sliding pin. The pin provides a lockout function which prevents rockshaft rotation and therefore also actuation of hydraulic valves controlled by rockshaft rotation.

In US2015/0156955 a multi-section agricultural implement is disclosed which may be folded between transport and operational positions. The disclosed implement is similar to that of the U.S. Pat. No. 8,636,078 but different wing sections are folded in a unique way so as to not interfere with one another.

There are a number of other agricultural implements in which component parts may be moved between a compacted transport position and an extended or deployed position for an agricultural operation. In general these known systems employ mechanical latching arrangements or simply rely on continued energization of one or more actuating cylinders for securing the movable parts in the transport position. The mechanical latching arrangements require an implement operator to dismount from the tractor or other traction unit to engage and/or disengage the latch. Reliance on continued energization of actuating cylinders may be employed so long as there is no hydraulic failure associated with one of those cylinders.

What is needed in the art is a secure system for retaining implement components in a transport position requiring minimal operator action to enable or disable the retention system.

SUMMARY OF THE INVENTION

The present invention provides a component latching arrangement which reduces the effort and time required in converting an agricultural implement having foldable components between transport and operational configurations.

The invention in one form is directed to an agricultural implement having a main frame including a pull hitch tube extending in a forward travel direction, and a tool bar coupled with and extending transverse to the pull hitch tube. There is at least one wing section coupled with the main frame section for pivotal movement about a generally vertical axis between an operational position and a stowed transport position. The wing section has a further toolbar portion extending from the main frame toolbar. There are components extending forward and rearward of the tool bar portion in the operational position. Each wing section component is pivotable about a corresponding generally horizontal axis to and from a transport position. There are hydraulic fold cylinders operable to pivot the forward and rearward components from their operational position to the transport position. First and second hydraulically actuable clamping arrangements retain the forward and rearward components in their respective transport positions independent of the fold cylinders. A shared hydraulic cylinder is coupled through a common actuating linkage for simultaneously moving the first and second clamping arrangements toward corresponding component retaining positions.

The invention in another form is directed to a latching arrangement for a retractable component of a traction unit towable agricultural implement. The latching arrangement has a lever with a component engaging hook near one end and a fulcrum pivotally fixed to a non-retractable portion of the implement. There is an actuating cylinder coupled to the lever which is controllable from the traction unit to engage the hook with the component and to disengage the hook from the component. A remotely operable actuating mechanism pivots the retractable component about a generally horizontal axis between the stowed position and an extended position for performing a farming operation. A component stop member limits pivotal motion of the component to the stowed position where the hook engages and forces the component into firm contact with the stop member.

An advantage of the present invention is component retention is not dependent on the hydraulic cylinder employed to pivot the component.

Another advantage is the latching mechanism is operable with minimal operator intervention.

Yet another advantage is the foldable components of a towable agricultural implement may have those components extended for operation and retracted for transport without the implement operator ever leaving the towing unit.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one embodiments of the invention, in one form, and such exemplification is not to be construed as limiting the scope of the invention in any manner.

DETAILED DESCRIPTION OF THE INVENTION

Figure 1:
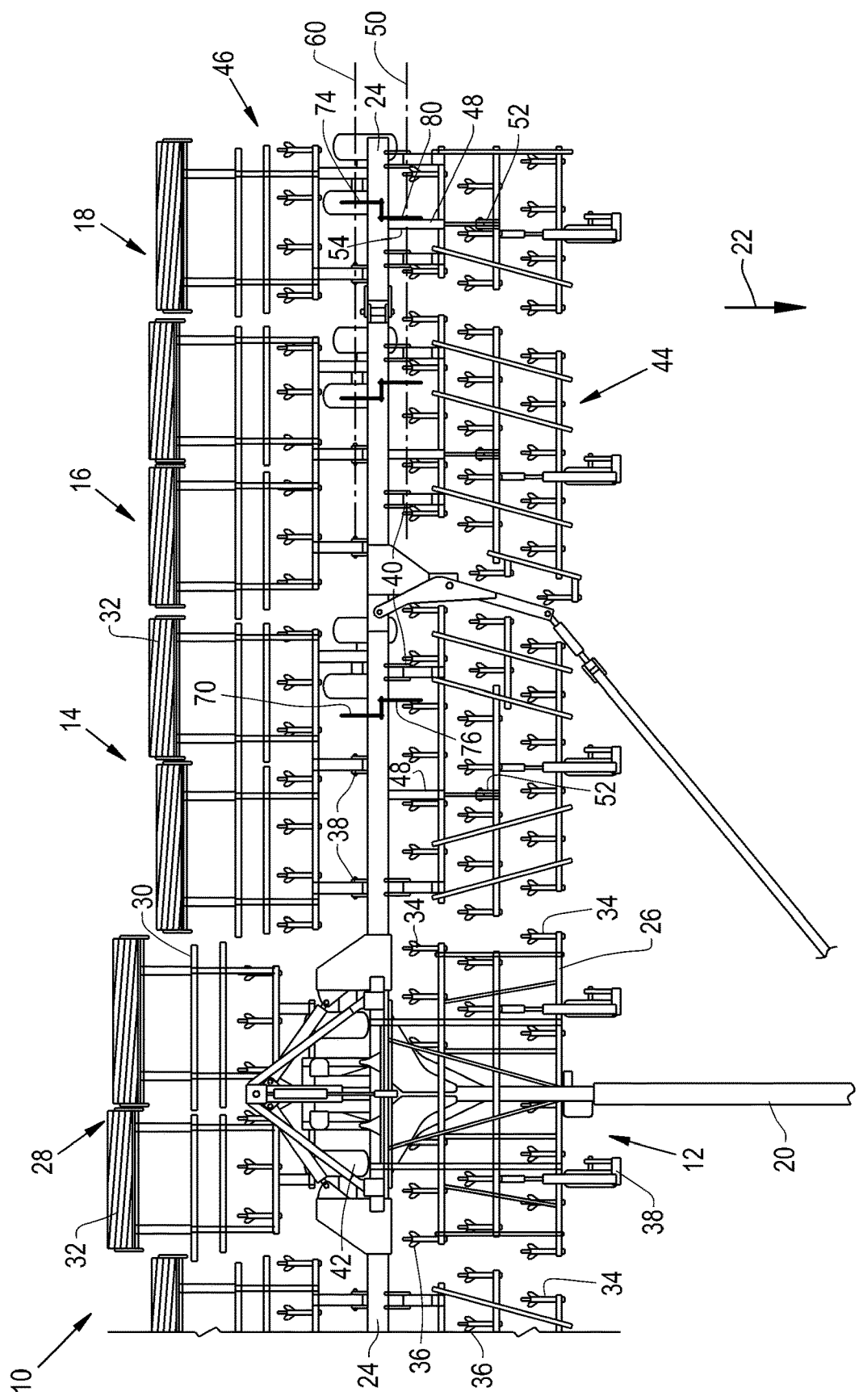
FIG. 1 is a top plan view of a portion of a towable agricultural implement incorporation the invention in one form.

Referring now to the drawings, and more particularly to FIG. 1, there is shown an embodiment of a tillage implement of the present invention. In the illustrated embodiment, the tillage implement is in the form of a multi-section field cultivator 10 for tilling and finishing soil prior to seeding. The cultivator has a main frame section 12 and a plurality of wing sections: an inner section 14, a middle section 16 and an outer wing section 18. There is a similar plurality of wing sections (not shown) which extend toward the left as viewed.

Main frame section 12 is the center section that is directly towed by a traction unit, such as an agricultural tractor (not shown). Main frame section 12 includes a pull hitch tube 20 extending in a forward travel direction 22, and a tool bar 24 which is coupled with and extends transverse to pull hitch tube 20. Main frame section 12 generally functions to carry a shank or other tool frame 26 for tilling the soil, and a rear auxiliary implement 28 for finishing the soil.

Rear auxiliary implement 28 includes a spring tooth drag 30 and a rolling basket 32 which co-act with each other to finish the soil. However, rear auxiliary implement can be differently configured, such as a spike tooth drag, cultivator shanks, etc. Shank frame 26 generally functions to carry cultivator shanks 34 with shovels 36 at their lower ends for tilling the soil. The shank frames are pivotally coupled with tool bar 24, such as with couplings 38 and 40. Certain ones of the shank frames are positioned in front of the tool bar 24 when in an operating position as in FIGS. 1-3, and folded up and over the tool bar 24 when in a transport position as shown in FIG. 4. A center shank sub-frame portion is attached to and positioned below pull hitch tube 20 and functions to till the soil in the intermediate open space between the two inner wing sections. This center portion is raised up and lowered with the raising and lowering of rear lift wheels 42 using a hydraulic cylinder. The couplings 38 function as an aft pivot for the aft tool frames 46 while the couplings 40 function as pivot for the fore tool frames 44 as will be better understood in reference to FIGS. 2 and 3.

Figure 2:
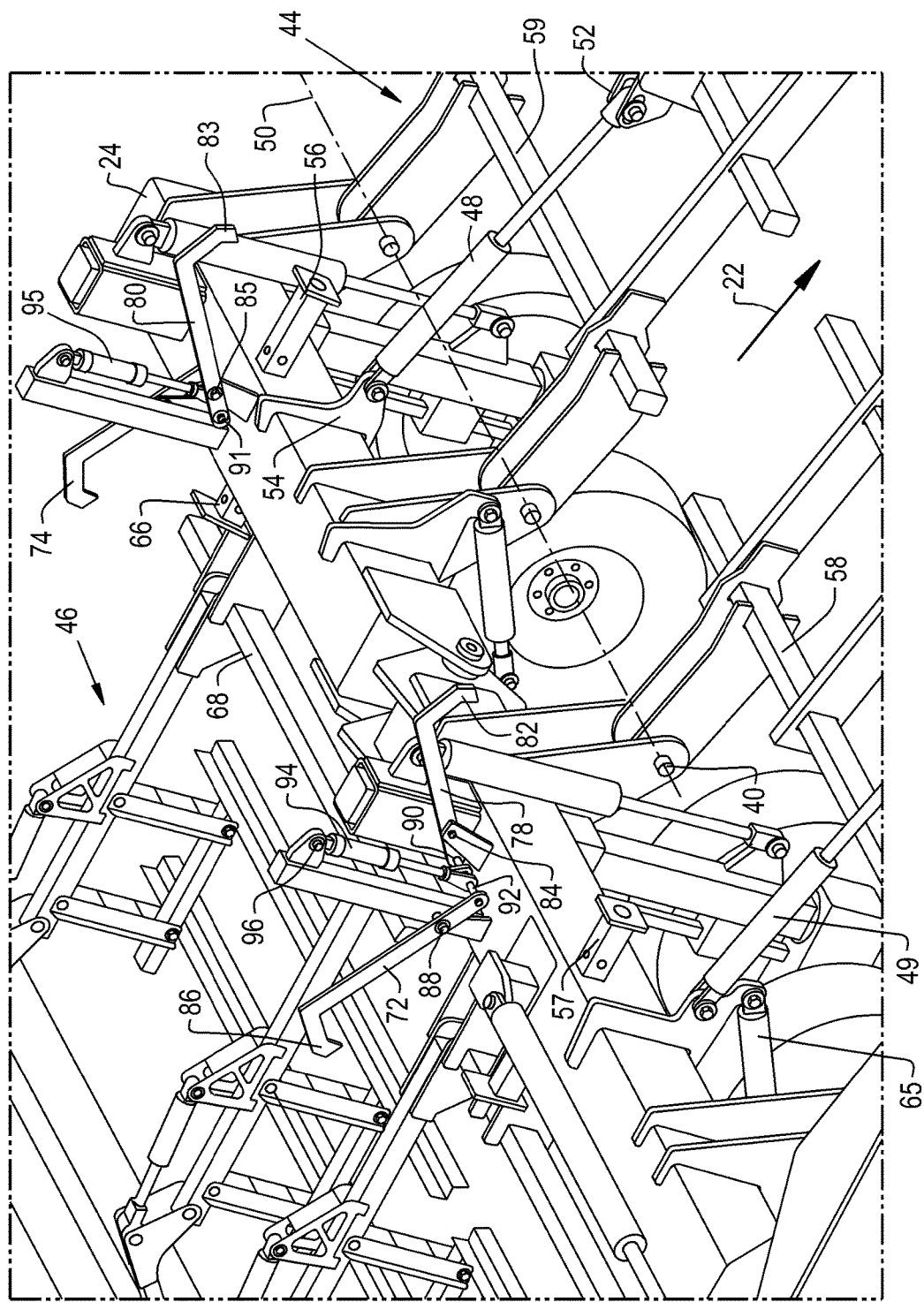
FIG. 2 is an isometric view of some of the wing sections of the implement of FIG. 1.

In FIG. 2, a fold cylinder 48 couples a clevis 52 extending from a portion of the fore tool frame 44 with a bracket 54 which is fixed to the tool bar 24. When cylinder 48 is enabled to retract the piston and piston rod, the portion of tool frame 44 associated with the outer wing 18 pivots about horizontal axis 50 from the illustrated generally horizontally deployed position to a generally vertical transport position. This pivotal motion is arrested by a stop 56 which engages a cross member 59 of the fore tool frame. Other tool frame portions may be retracted similarly. For example, the fore tool frame portion of wing 16 has a cross member 58 which engages a stop 57 when that portion is raised. The aft tool frame portions are similarly pivotable about a generally horizontal axis 60 defined by the coupling between hinge portions 62 and 64 as seen in FIG. 3.

Figure 3:
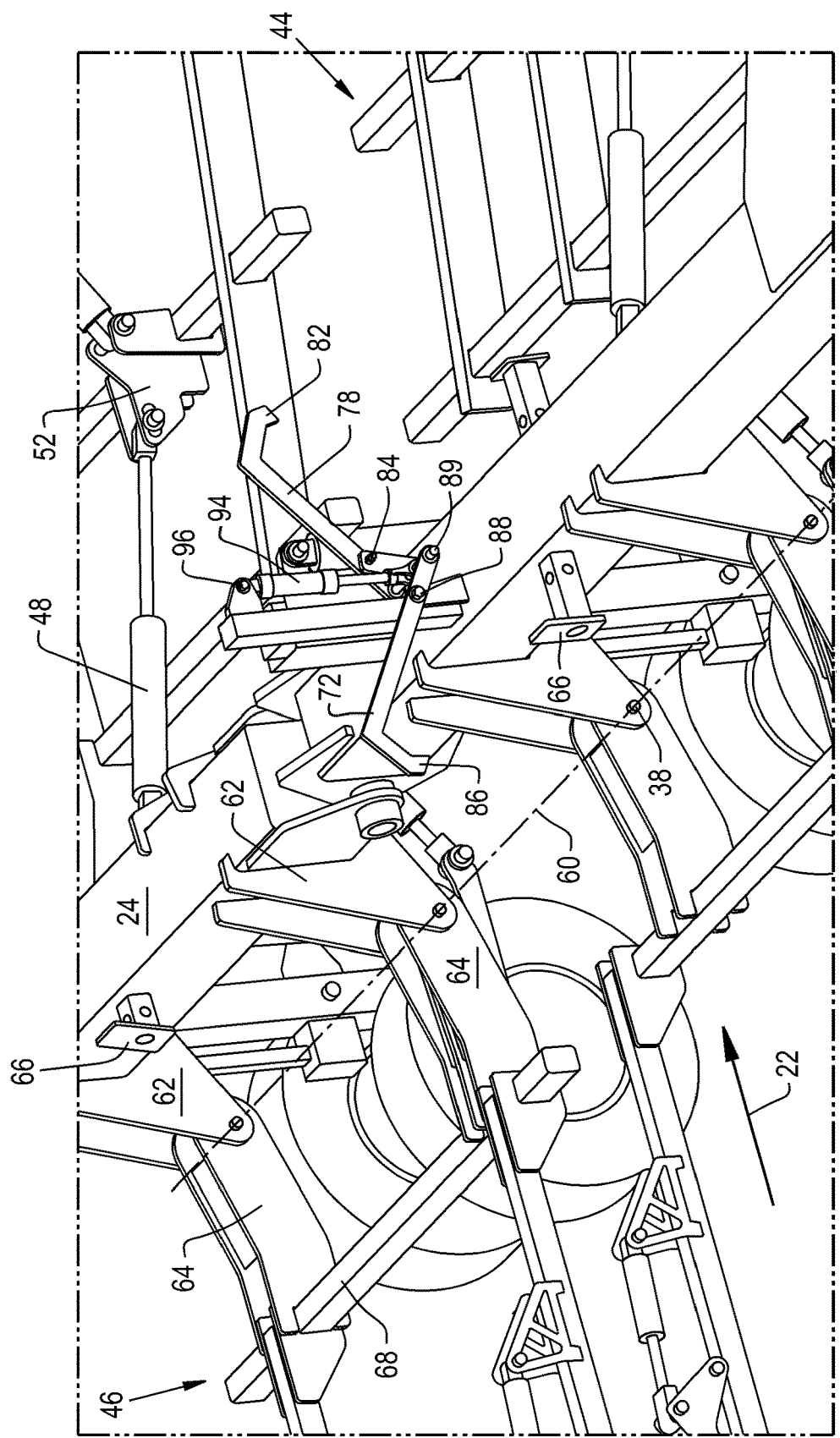
FIG. 3 is an isometric view of a portion of the wing sections of FIG. 2 from a different perspective.
Figure 4:
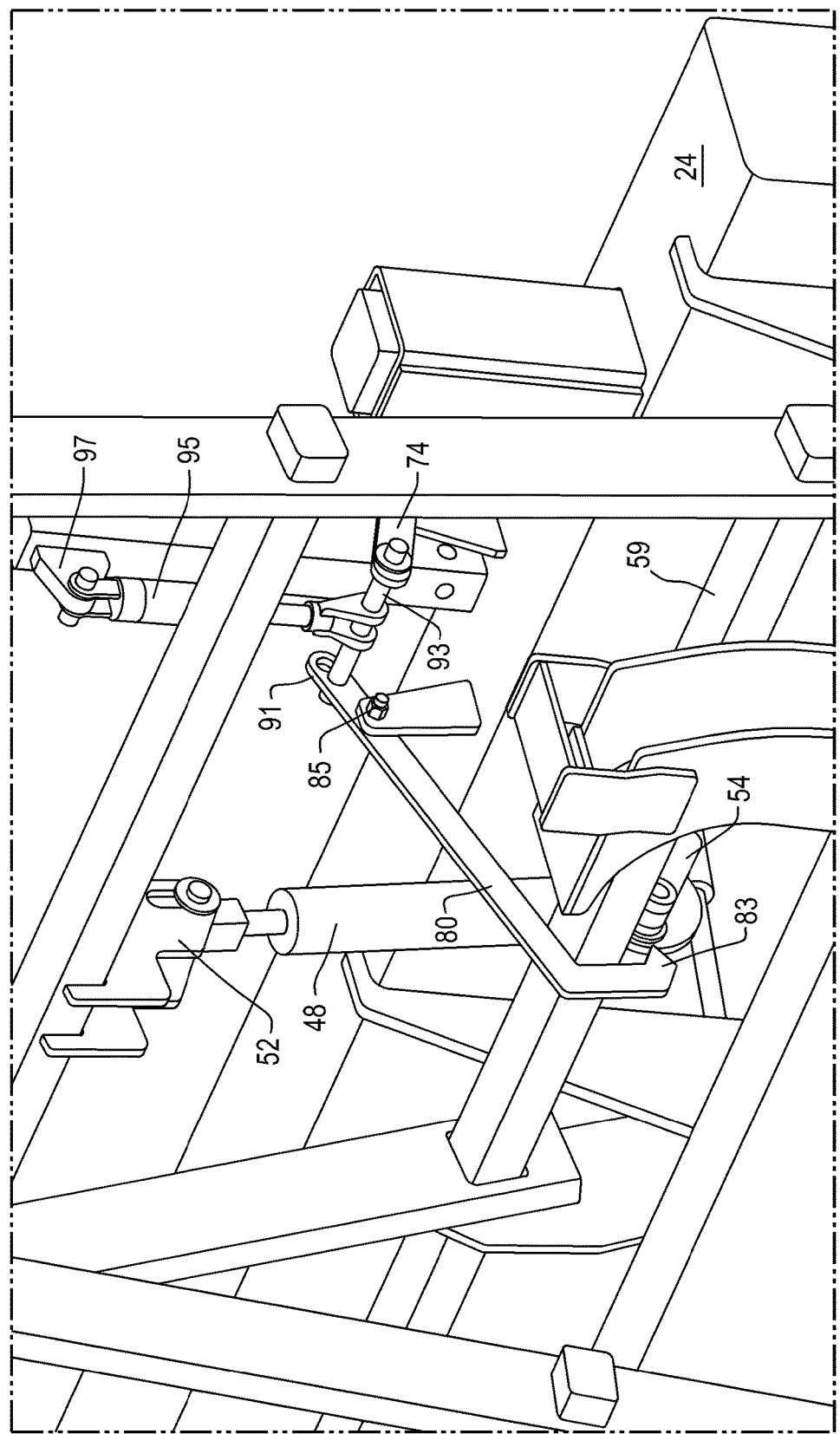
FIG. 4 is an isometric view showing the fore and aft tool frames of a single wing section folded and latched in the retracted position from a still further perspective.

In FIG. 3, hinge portions 62 are fixed to and extend from the tool bar 24 while portions 64 are formed as part of the aft tool frame 46. Pivotal motion of the aft tool frame is controlled by rearward hydraulic fold cylinders such as 65 (FIG. 2) and is arrested by stops 66. The aft fold stops 66 are engaged by aft tool frame cross members 68 in the transport position.

Returning to FIG. 1, note there is a latch 70 extending rearwardly from tool bar 24 associated with the tool frame of wing section 14. There are similar rearwardly extending latches 72 and 74 for wings 16 and 18 respectively. Similar latches 76, 78 and 80 extend forward from the tool bar 24 for the respective fore tool frames. The structure of an exemplary latch 78 is more readily seen in FIGS. 2 and 3.

In FIG. 2, the latch 78 has a hook end 82 shaped to grasp the cross member 58 of the fore tool frame and secure the frame in the raised position. The latch is pivotally fixed to the tool bar or other non-retractable portion of the implement by a pivot 84 which functions as a fulcrum for a first class lever. The lever actuating end 90 opposite the hook is pivotally attached to a transverse bar 92. Bar 92 is coupled to and actuated by a hydraulic cylinder 94 which is controllable by the implement operator from the traction unit and is independent of the fold cylinder such as 48. Latch actuating cylinder 94 is anchored at 96 to the tool bar and has a piston rod coupled to the transverse bar 92. Similarly, the latch 80 for the fore tool frame portion of wing 18 has a hook end 83 shaped to grasp the cross member 59 of the fore tool frame and secure the frame in the raised position. The latch 80 is pivotally fixed to the tool bar or other non-retractable portion of the implement by a pivot 85. Another latch actuating cylinder 95 is anchored at 97 to the tool bar and has a piston rod coupled to a transverse bar 93. The transverse bar 93 is pivotally coupled to the lever actuation end 91 as better seen in FIG. 4. Illustrative transverse bar 92 is pivotally coupled to the actuating end 90 of latch 82 as well as the actuating end 89 of rearward latch 72 so that the two latches operate in unison under the control of a shared cylinder 94. Other pairs of fore and aft latches may be similarly coupled for conjoint motion.

When the field work is complete, the operator may pivot the several fore tool frames by actuating hydraulic cylinders such as 48 and 49. When the frames reach their respective stops such as 56 and 57, pivotal motion ceases. Similarly, the rearward extending tool frames are pivoted to their raised positions engaging the stops 66. The operator may then actuate latching cylinders such as 94 and 95. The cylinders retract their respective piston rods raising the transverse bars 92 and 93 and the affixed lever actuation ends 89, 90 and 91. Vertical bar motion causes hook ends 82 and 86 of the latches to lower into engagement with their respective tool frame cross members securing the frames in the raised position for transport. Note particularly in FIG. 4 the elongated slot where the lever ends are coupled to the bar. This slot allows linear actuation of the piston rod and rotational motion of the lever arms about their respective fulcrums 84 and 88.

When the operator desires to deploy the tool frames for an agricultural operation, the hydraulic latching cylinders such as 94 and 95 are enabled remotely by the operator to extend their piston rods unlatching both fore and aft tool frames. Then, still at the remote location, the operator enables fold cylinders such as 48 and 49 to extend their piston rods lowering the tool frames into an operational position.

Several current machines employ remotely actuable hydraulic cylinders for raising and lowering tool frames. The present invention provides a remotely actuable latching system so that the operator never need leave the traction unit either for deploying or for retracting the tool frames.

The invention has been described with reference to an agricultural machine having both fore and aft extending tool frames which may be pivoted upwardly into juxtaposition for travel allowing latching of both fore and aft tool frames with a single hydraulic cylinder. Separate cylinders could be used, each with a single latch. Further application of the invention is not limited to such machines, but is applicable to more simplistic machines such as described in the above mentioned U.S. Pat. No. 7,438,137 where folding is simply upward and inward. Pneumatic cylinders or electrical solenoids could be used in some applications rather than the described hydraulic cylinders. Many other variations are possible.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural implement having:
   at least one movable component which is movable between a stowed position and a laterally extended position for performing a farming operation;
   a first remotely operable actuating mechanism for moving the at least one movable component between the stowed and laterally extended positions;
   a lever having a component engaging hook near one end and a fulcrum fixed to the implement:
   a second remotely operable actuating mechanism for selectively engaging the hook and the at least one movable component only when the at least one movable component is in the stowed position,
   wherein the at least one movable component is pivotable about a generally horizontal axis between the stowed and laterally extended positions, the implement further comprising a component stop member for limiting pivotal motion of the at least one movable component to the stowed position, the component engaging hook adapted to engage and force the at least one movable component into contact with the stop member.

2. The agricultural implement of claim 1, wherein the second actuating mechanism is operable independently of the first actuating mechanism.

3. The agricultural implement of claim 1, wherein the second actuating mechanism is operable from the same location as the first actuating mechanism.

4. The agricultural implement of claim 1, wherein the second actuating mechanism comprises a hydraulic cylinder fixed to the implement and having a piston rod coupled to the lever near a lever end opposite said one end.

5. An agricultural implement, comprising:
   a main frame section including a pull hitch tube extending in a forward travel direction, and a tool bar coupled with and extending transverse to said pull hitch tube;
   at least one wing section coupled with said main frame section for pivotal movement about a generally vertical axis between an operational position and a stowed transport position, the wing section including a further toolbar portion extending from the main frame toolbar, a component extending rearward of the tool bar portion and another component extending forward of the tool bar portion in the operational position, each component being pivotable about a corresponding generally horizontal axis into a transport position;
   a first hydraulic fold cylinder operable to pivot the forward component from the operational position to the transport position;
   a second hydraulic fold cylinder operable to pivot the rearward component from the operational position to the transport position;
   a first hydraulically actuable clamping arrangement for retaining the forward component in the transport position independent of the first fold cylinder; and
   a second hydraulically actuable clamping arrangement for retaining the rearward component in the transport position independent of the second fold cylinder, wherein each clamping arrangement comprises a first class lever having a fulcrum pivotally fixed to the tool bar portion, an actuating linkage coupled near one lever end and a wing section component engaging hook near the other lever end, and
   a shared hydraulic cylinder coupled with the actuating linkage for simultaneously moving the first and second clamping arrangements toward corresponding component retaining positions.

6. The agricultural implement of claim 5, wherein the actuating linkage includes a common linkage member connected with the shared hydraulic cylinder and coupling the respective one lever ends for conjoint motion.

7. The agricultural implement of claim 6 wherein the common linkage member comprises an elongated rod pivotally coupled near respective ends to each said one lever end.

8. The latching arrangement of claim 5, wherein the agricultural implement is adapted to be towed by a traction unit, the shared cylinder being controllable from the traction unit.

9. The agricultural implement of claim 5, further including a wing section component stop for each component, the wing section component stop being fixed to the toolbar for engaging a portion of the corresponding wing section component to limit further pivotal motion of the component when in the transport position.

10. The agricultural implement of claim 9, wherein each clamping arrangement urges the corresponding wing section component into secure engagement with the corresponding component stop when the component is in the transport position.

11. A latching arrangement for a retractable component of a traction unit towable agricultural implement, comprising:
    a lever having a component engaging hook near one end;
    a fulcrum pivotally fixed to a non-retractable portion of the implement;
    an actuating cylinder coupled to the lever and controllable from the traction unit to engage the hook with the component and to disengage the hook from the component, wherein the actuating cylinder is coupled to the lever near the lever end opposite the hook, and wherein the retractable component is pivotable about a generally horizontal axis between a first stowed position and a second laterally extended position for performing a farming operation;
a remotely operable actuating mechanism for moving the retractable component between the stowed and extended positions; and
a component stop member for limiting pivotal motion of the retractable component to the stowed position, the component engaging hook engaging and forcing the retractable component into contact with the stop member.

\* \* \* \* \*